(12) United States Patent
Sul et al.

(10) Patent No.: US 8,712,633 B2
(45) Date of Patent: Apr. 29, 2014

(54) APPARATUS AND METHOD FOR PROVIDING VEHICLE DATA FOR TESTING PRODUCT

(75) Inventors: Dong-Myung Sul, Daejeon-si (KR); Byung-Yun Lee, Daejeon-si (KR); Young-Ii Choi, Daejeon-si (KR); Byung-Sun Lee, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 17 days.

(21) Appl. No.: 13/483,575

(22) Filed: May 30, 2012

(65) Prior Publication Data
US 2012/0311383 A1 Dec. 6, 2012

(30) Foreign Application Priority Data

May 31, 2011 (KR) .................. 10-2011-0052502

(51) Int. Cl.
*G01M 17/00* (2006.01)
*G06F 11/00* (2006.01)
(52) U.S. Cl.
USPC .................. 701/32.8; 714/25; 701/29.1
(58) Field of Classification Search
USPC .................. 701/32.8, 29.1; 714/25
See application file for complete search history.

(56) References Cited

U.S. PATENT DOCUMENTS

| 4,404,639 | A | * | 9/1983 | McGuire et al. ............ 701/29.3 |
| 5,602,733 | A | * | 2/1997 | Rogers et al. .............. 701/31.6 |
| 6,073,089 | A | * | 6/2000 | Baker et al. ................ 702/185 |
| 6,745,151 | B2 | * | 6/2004 | Marko et al. ............... 702/182 |
| 7,027,909 | B2 | * | 4/2006 | deBotton et al. ............ 701/111 |
| 7,689,334 | B2 | * | 3/2010 | Massen et al. .............. 701/31.4 |
| 7,725,221 | B2 | * | 5/2010 | Maris ......................... 701/14 |
| 8,160,769 | B1 | * | 4/2012 | Thompson et al. .......... 701/33.2 |
| 2002/0044049 | A1 | * | 4/2002 | Saito et al. ................. 340/438 |
| 2004/0153269 | A1 | * | 8/2004 | Kalas, Jr. ................... 702/81 |
| 2007/0028220 | A1 | * | 2/2007 | Miller et al. ............... 717/124 |
| 2007/0198874 | A1 | * | 8/2007 | Watanabe ................... 714/49 |
| 2007/0213895 | A1 | * | 9/2007 | Nakayama ................. 701/29 |
| 2009/0150118 | A1 | * | 6/2009 | Naima ....................... 702/165 |
| 2012/0144241 | A1 | * | 6/2012 | Son et al. ................... 714/38.1 |

FOREIGN PATENT DOCUMENTS

KR 2000-0073308 A 12/2000

* cited by examiner

*Primary Examiner* — Thomas Black
*Assistant Examiner* — Tyler Paige
(74) *Attorney, Agent, or Firm* — William Park & Associates Patent Ltd.

(57) ABSTRACT

Provided is a vehicle data providing apparatus supporting to easily generate vehicle internal communication data at the development stage of a product to perform a test. According to an aspect, there is provided a vehicle data providing apparatus including: a vehicle data analyzer configured to analyze a vehicle data file that is used in a vehicle, and to provide a reference data graph about reference data included in the vehicle data file; a vehicle data changing unit configured to receive a user input signal for changing the reference data, and to change related data associated with the reference data based on the reference data graph; and a test data file generator configured to generate a vehicle data file for test, including the changed reference data and the changed related data.

20 Claims, 8 Drawing Sheets

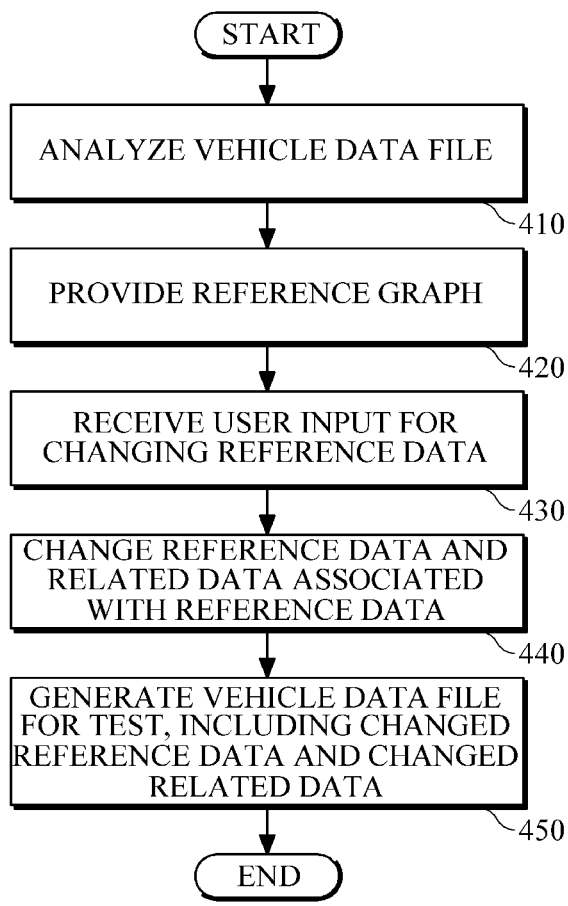

APPARATUS AND METHOD FOR PROVIDING VEHICLE DATA FOR TESTING PRODUCT

CROSS-REFERENCE TO RELATED APPLICATION

This application claims the benefit under 35 U.S.C. §119(a) of a Korean Patent Application No. 10-2011-0052502, filed on May 31, 2011, the entire disclosure of which is incorporated herein by reference for all purposes.

BACKGROUND

1. Field

The following description relates to a data processing technique, and more particularly, to an apparatus and method for generating and providing vehicle data for testing products that use vehicle data.

2. Description of the Related Art

Vehicle internal communication data can be extracted through OBD-II (On Board Diagnostic 2) port, and an OBD system functions to show problems of a vehicle to a driver or a car mechanic through a Malfunction Indicator Lamp (MIL). When the MIL is on, the user can recognize that a problem occurs in the vehicle so that he or she can run to a car mechanic to solve the problem. The vehicle internal communication data is stored as the results of self-diagnosis on problems of a vehicle and can be used to provide a car mechanic with detailed technical information for solving the problems.

When a driver drives a vehicle, the OBD system continues to monitor the state of the vehicle. If the OBD system detects a problem at an engine ignition system, at an exhaust system, etc., a MIL lamp for informing the driver of occurrence of a problem is turned on and the MIL lamp is maintained in the turned-on state until the problem is solved. Some vehicles have a function of showing problems generated at the other internal systems, as well as a function for self-diagnosis on excessive generation of exhaust gas due to a malfunction of the engine system, which is the original purpose of the OBD system.

Vehicles supporting the OBD-II use three kinds (in more detail, five kinds) of communication standards: VPW-PWM (Variable Pulse Width-Pulse Width Modulation; SAE-J1850), CAN (Controller Area Network; ISO 15765, SAE-J2234), and ISO (International Organization for Standardization; ISO 1941-2, ISO 14230-4). Vehicle manufacturers adopt different kinds of communication standards, even for each vehicle model.

However, in many cases, since the three communication standards are all used, an ODB II scanner that diagnoses a vehicle with an ODB-II interface has been designed to support all signals based on the communication standards. Meanwhile, since the individual communication standards are allocated different data lines, which one of the communication standards is used is visible to the naked eye.

However, in a conventional test of using vehicle internal data, high cost test equipment is directly connected to a vehicle to receive vehicle data from the vehicle and perform the test based on the vehicle data. Or, software simulation equipment is used to perform a test using data prepared for predetermined situations. In the conventional test, it is difficult that a user himself or herself changes data, and also when a user corrects specific data, the correction is not automatically reflected to other data related to the data. For these reasons, there are difficulties in performing a test at the development stage of a product.

SUMMARY

The following description relates to a system capable of performing a test by easily generating vehicle internal communication data at the development stage of a product.

In one general aspect, there is provided a vehicle data providing apparatus including: a vehicle data analyzer configured to analyze a vehicle data file that is used in a vehicle, and to provide a reference data graph about reference data included in the vehicle data file; a vehicle data changing unit configured to receive a user input signal for changing the reference data, and to change related data associated with the reference data based on the reference data graph; and a test data file generator configured to generate a vehicle data file for test, including the changed reference data and the changed related data.

In another general aspect, there is provided a vehicle data providing method including: analyzing a vehicle data file that is used in a vehicle, and providing a reference data graph about reference data among data included in the vehicle data file; receiving a user input signal for changing the reference data based on the reference data graph; and changing the reference data and related data associated with the reference data according to reception of the user input signal; and generating a data file for test, including the changed reference data and the changed related data.

Other features and aspects will be apparent from the following detailed description, the drawings, and the claims.

BRIEF DESCRIPTION OF THE DRAWINGS

FIG. 4 is a flowchart illustrating an example of a vehicle data providing method.

Figure 1:
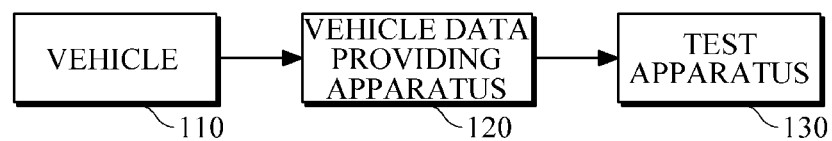
FIG. 1 shows an environment where a vehicle data providing apparatus is used.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descrip- FIG. 1 shows an environment where a vehicle data providing apparatus 120 is used.

Referring to FIG. 1, the vehicle data providing apparatus 120 may be connected to a vehicle 110 and a test apparatus 130. The test apparatus 130, which is a product that uses vehicle data, may be a black box for vehicle, a navigation system, etc. The vehicle data providing apparatus 120 may be configured to extract vehicle data from the vehicle 110 and store, manage, and correct the vehicle data to be suitable for a test environment of the test apparatus 130.

The vehicle data providing apparatus 120 is connected to the vehicle 110 only while the vehicle data providing apparatus 120 collects vehicle data, and thereafter can efficiently test the test apparatus 130 without having to connect to the vehicle 110. The vehicle data providing apparatus 120 may be implemented as one of various kinds of electronic products, such as a personal computer, a note book, a mobile terminal, a smart phone, etc.

The vehicle data providing apparatus 120 is a system for raising the reliability of a test by actively and automatically changing, when vehicle internal data for test is corrected at the development stage of the test apparatus 130, other data related to the corresponding data. For example, when a user moves a graph created using data collected from a vehicle to a desired range of values while viewing the graph, the vehicle data providing apparatus 120 changes the graph and corrects values corresponding to the changed graph, thereby recreating desired vehicle data. At this time, the vehicle data providing apparatus 120 also may actively and automatically change other data related to reference data. The meaning of actively and automatically changing data is, instead of correcting a plurality of pieces of vehicle internal data individually, automatically changing, when a single piece of vehicle data is corrected, other data related to the vehicle data to values estimated under actual driving conditions with reference to database established using pre-stored data.

The vehicle data may be various vehicle internal communication data, such as a driving speed, the RPM of the engine, a battery voltage, the temperature of cooling water, etc. The vehicle data may be classified into reference data and related data, wherein the reference data can be corrected by the user of the vehicle data providing apparatus 120 and the related data varies according to a change of the reference data. The reference data and related data may be set by the user of the vehicle data providing apparatus 120. The vehicle data that is used in the vehicle 110 may consist of data packets, and a group of a plurality of data packets may be configured as a vehicle data file. Each data packet may be based on a communication standard, such as CAN (Controller Area Network), VPW-PWM (Variable Pulse Width-Pulse Width Modulation), or ISO (International Organization for Standardization). The data packet may include an ID for identifying vehicle data, a data value of the corresponding vehicle data, additional information for error correction and communication, etc.

The vehicle data providing apparatus 120 may collect vehicle data under actual driving conditions, and establish vehicle information database about interested reference data and related data based on the collected vehicle data. While establishing the vehicle information database, the vehicle data providing apparatus 120 can acquire information about changes of the related data values according to changes of reference data values. That is, the vehicle data providing apparatus 120 may estimate related data values changed according to changes of reference data values. Also, the vehicle data providing apparatus 120 may display the processing results of the vehicle data for the user. The vehicle information database may be generated for each vehicle model or for each vehicle.

For example, the vehicle data providing apparatus 120 may analyze the RPM of the engine, a battery voltage, the temperature of cooling water, etc. according to a change of the vehicle's driving speed, and establish the vehicle information database based on the results of the analysis. Accordingly, when reference data is corrected, the vehicle data providing apparatus 120 may correct other data related to the reference data with reference to the vehicle information database that stores changes of the related data according to changes of the reference data. If the user wants to test the test apparatus 130 in a specific speed range, the vehicle data providing apparatus 120 may correct reference data according to the specific speed range input by the user, correct related data according to the corrected reference data, and then transfer the results of the correction to the test apparatus 130, so that the test is performed in conditions similar to actual driving conditions. Furthermore, since the vehicle data providing apparatus 120 can generate estimated data under vehicle test environments that have limitation in actual implementation, a wide range of test results on the test apparatus 130 can be acquired.

The vehicle data providing apparatus 120 can automatically extract changes of related data according to changes of reference data from the vehicle information database. However, the vehicle data providing apparatus 120 is configured such that the user can arbitrarily adjust changes of related data according to changes of reference data using correction coefficients, etc. That is, the vehicle data providing apparatus 120 can reflect a user's intention to a test.

Figure 2:
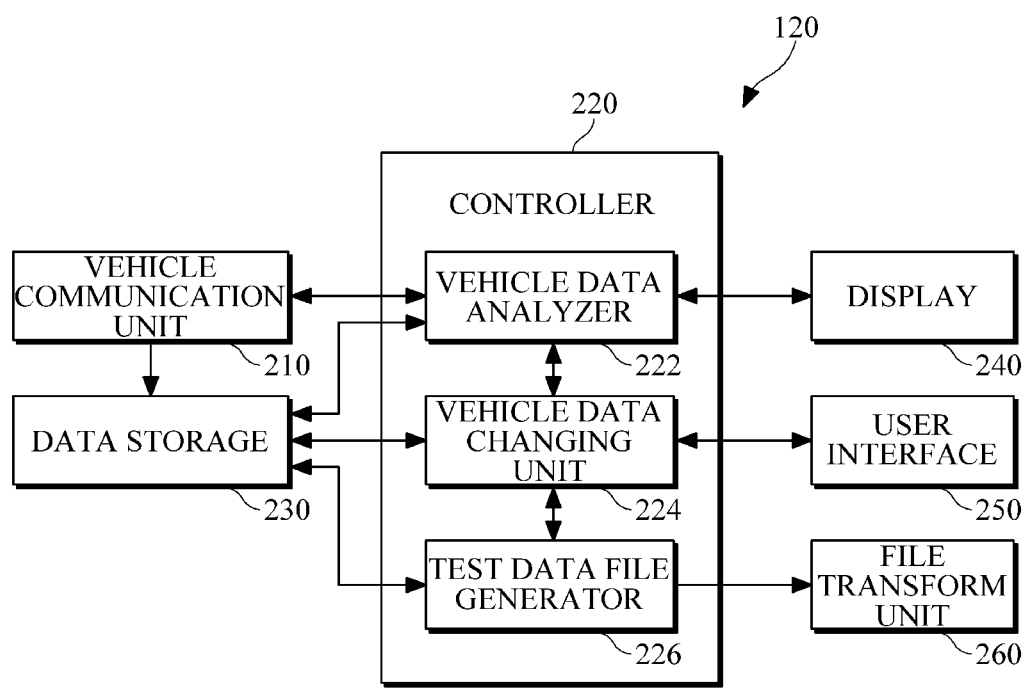
FIG. 2 is a diagram illustrating an example of a vehicle data providing apparatus.

FIG. 2 is a diagram illustrating an example of the vehicle data providing apparatus 120.

Referring to FIG. 2, the vehicle data providing apparatus 120 includes a vehicle communication unit 210, a controller 220, a data storage 230, a display 240, a user interface 250, and a file transfer unit 260.

The vehicle communication unit 210 receives vehicle data for communication control from control components of a vehicle. According to an example, the control components of the vehicle may include a motor control unit (HMCU), a battery management system BMS, an engine control unit (ECU), an electronic throttle controller (ETC), and a torque control unit (TCU). The vehicle communication unit 210 is interpreted to include a technical configuration capable of receiving data from the control components. The vehicle data is received in the format of a data packet, and may be received as a vehicle data file including a plurality of data packets accumulated for a predetermined time period.

The controller 220 is configured to control the entire operation of the vehicle data providing apparatus 120. The controller 220 may include a vehicle data analyzer 222, a vehicle data changing unit, and a test data file generator 226. The vehicle data analyzer 222, the vehicle data changing unit, and the test data file generator 226 are connected to each other for data communication.

The vehicle data analyzer 222 collects vehicle data packets and stores the vehicle data packets as a vehicle data file in the data storage 230. The vehicle data analyzer 222 decodes each data packet to a format that can be used by the vehicle data providing apparatus 120, and checks a vehicle data ID included in the data packet to determine whether reference data or related data is included in the data packet. The vehicle data analyzer 222 monitors a changed amount of reference data in the vehicle data file, also monitors a changed amount of related data according to the changed amount of reference data, and stores the changed amounts of reference data and related data to thereby generate vehicle information database.

For example, if the reference data is speed and data related to speed is RPM, changes in RPM according to changes in speed may be stored in a format of a Table 1, as follows.

TABLE 1

| Change in Speed | Change in RPM | Changed amount |
|---|---|---|
| 50->60 | 1000->1200 | 20 |
| 60->70 | 1200->1500 | 30 |
| 70->80 | 1500->2000 | 50 |
| 80->90 | 2000->2400 | 40 |
| 90->100 | 2400->3000 | 60 |

The example of Table 1 shows the case where a change range of reference data is from 50 to 100 and a change range of the related data is from 1000 to 3000. In this case, the vehicle data analyzer 222 may divide the change range of the reference data in a unit of 10 and monitors a changed amount of the related data when the reference data increases by 10, thereby generating vehicle information database. Thereafter, when receiving a request for changing reference data from a user, the vehicle data analyzer 222 may provide a changed value of the related data corresponding to the requested changed amount of the reference data with reference to the vehicle information database. In Table 1, the changed values of related data are listed in correspondence to the changed values of reference data increased in a unit of 10.

Also, the vehicle data analyzer 222 predicts a changed amount of related data from a changed amount of reference data, and stores the predicted, changed amount of the related data to reflect it to the vehicle information database. Accordingly, the vehicle data analyzer 222 may predict unanalyzed vehicle data based on analyzed vehicle data. For example, if a changed amount of related data corresponding to a changed amount of a specific range of reference data has been not monitored, the vehicle data analyzer 222 may predict the changed amount of the related data based on a relationship between the previously monitored, changed amounts of reference data and related data.

The vehicle data analyzer 222 analyzes a plurality of data packets included in the vehicle data file, and provide a reference data graph about reference data included in the vehicle data file. Also, the vehicle data analyzer 222 may provide a related data graph about at least one piece of related data associated with the reference data. The reference data graph may be displayed through the display 240 and provided to a user. The vehicle data analyzer 222 may configure a screen including both a reference data graph and a related data graph and display the screen through the display 240.

The vehicle data changing unit 224 may change, when receiving a user input for changing the reference data, related data associated with the reference data based on the reference data graph. A changed value of related data according to a changed value of reference data is decided based on information stored in the vehicle information database. The changed values of reference data and the changed values of related data according to the changed values of the reference data may be stored in the data storage 230. If the vehicle data changing unit 224 changes reference data and changes the related data according to the change of the reference data, the vehicle data analyzer 222 may configure a screen that shows the changed values of the reference data and related data and display the screen through the display 240.

If a user input signal instructs to change reference data that is within a correction region, the vehicle data changing unit 224 changes the reference data and related data associated with the reference data. On the contrary, if a user input signal instructs to change reference data that is not within the correction region, the vehicle data changing unit 224 may ignore the user input signal.

The test data file generator 226 generates a vehicle data file for test, including the changed reference data and the changed reference data. The vehicle data file for test has the same format as the received vehicle data file. The vehicle data file for test may be stored in the data storage 230.

The data storage 230 stores vehicle data files including vehicle data packets received from the vehicle communication unit 210. The data storage 230 may provide a storage area for data, programs, etc. needed for data processing of the controller 220. Also, the data storage 230 may store vehicle information data that includes information about related data corresponding to reference data, and information about the changed amounts of the related data according to the changed amounts of the reference data.

The user interface 250 receives a signal for manipulating the vehicle data providing apparatus 120 from a user. A user input signal for changing reference data may be a signal for moving a part included in a correction region of the reference data graph in a predetermined direction, such as dragging and dropping a specific part of the reference data graph using a mouse. The user interface unit 250 may receive a user input signal for setting reference data and related data associated with the reference data with respect to vehicle data included in a vehicle data file. The user interface unit 250 may be a keypad, a mouse, a joystick, a touch pad, etc.

The file transfer unit 260 transfers the test data file generated by the test data file generator 226 to the test apparatus 130 (See FIG. 1).

Figure 3A:
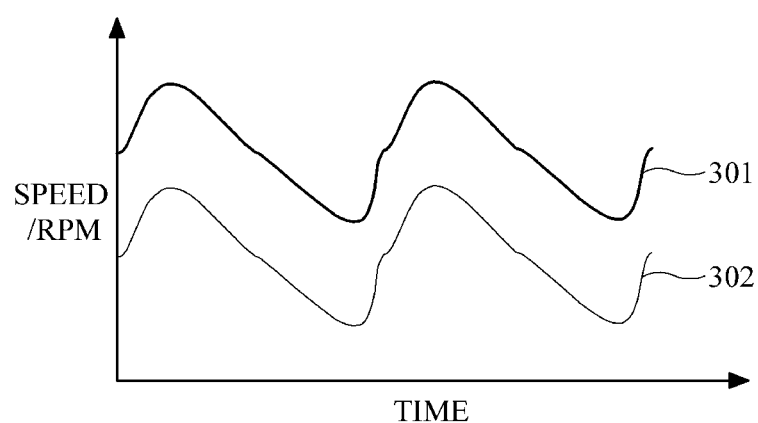
FIG. 3A is a graph showing reference data and related data of vehicle data.
Figure 3B:
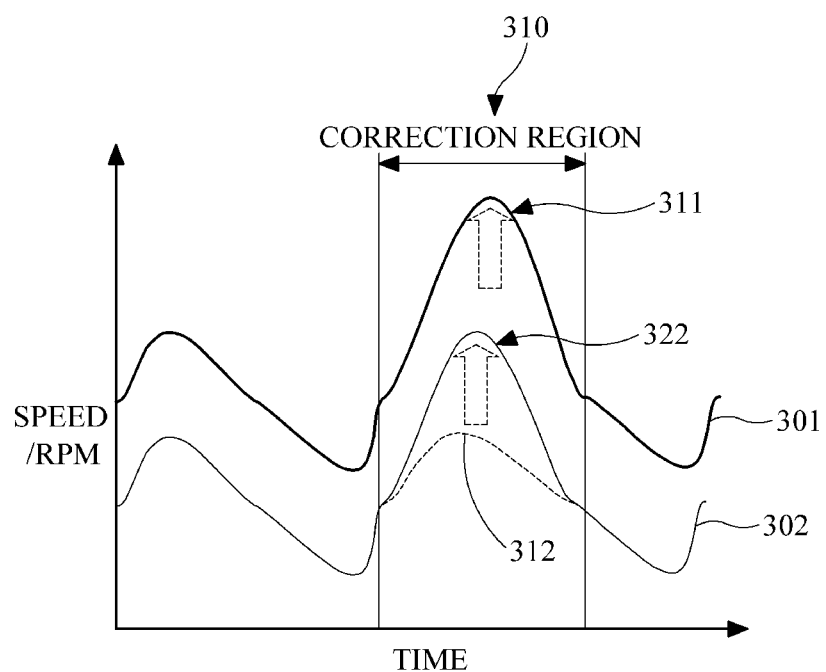
FIG. 3B is a graph showing a change of the related data when a user changes the reference data in the graph of FIG. 3A.

FIG. 3A is a graph showing reference data and related data of vehicle data, and FIG. 3B is a graph showing a change of the related data when a user changes the reference data in the graph of FIG. 3A.

FIG. 3A shows a reference data graph 301 about reference data that can be corrected among data for test in vehicle data stored in vehicle information database, and a related data graph 302 about related data that can be corrected in association with the reference data.

As shown in FIG. 3B, a user may set a correction region 310 in the reference data graph 301. For example, the user may set a correction region 310 in the reference data graph 301 by dragging a mouse or by inputting correction start and end time values specifying the correction region 310 through a keyboard. As shown in FIG. 3B, the user may change reference data values in the correction region 310 by moving the corresponding part of the reference data graph 301 to a desired location, as shown by an arrow 311 of FIG. 3B. After moving the corresponding part of the reference data graph 301, the vehicle data providing apparatus 120 checks a changed amount of the related data according to the change of the reference data and automatically moves the corresponding part of the related data graph 302, as shown by an arrow 312 of FIG. 3B. As such, the user can check whether the desired data values have been exactly reflected by viewing the changed graph.

FIG. 4 is a flowchart illustrating an example of a vehicle data providing method. The vehicle data providing method is performed by a vehicle data providing apparatus (for example, the vehicle data providing apparatus 120 of FIG. 2).

First, the vehicle data providing apparatus provides a reference data graph about reference data among data included in data packets (420). The vehicle data providing apparatus may provide a related data graph about related data associated with the reference data, together with the reference data graph. If a plurality of pieces of related data have been set in correspondence to a single piece of reference data, the vehicle data providing apparatus may provide a plurality of related data graphs corresponding to the respective pieces of related data.

Then, the vehicle data providing apparatus receives a user input signal for changing the reference data, based on the reference data graph (430).

The vehicle data providing apparatus changes in response to the user input signal and automatically changes related data associated with the changed reference data (440).

Successively, the vehicle data providing apparatus generates a test data file including the changed reference data and the changed related data (450). The test data file is transferred to a test apparatus to be able to be used for a test of the test apparatus.

Figure 5:
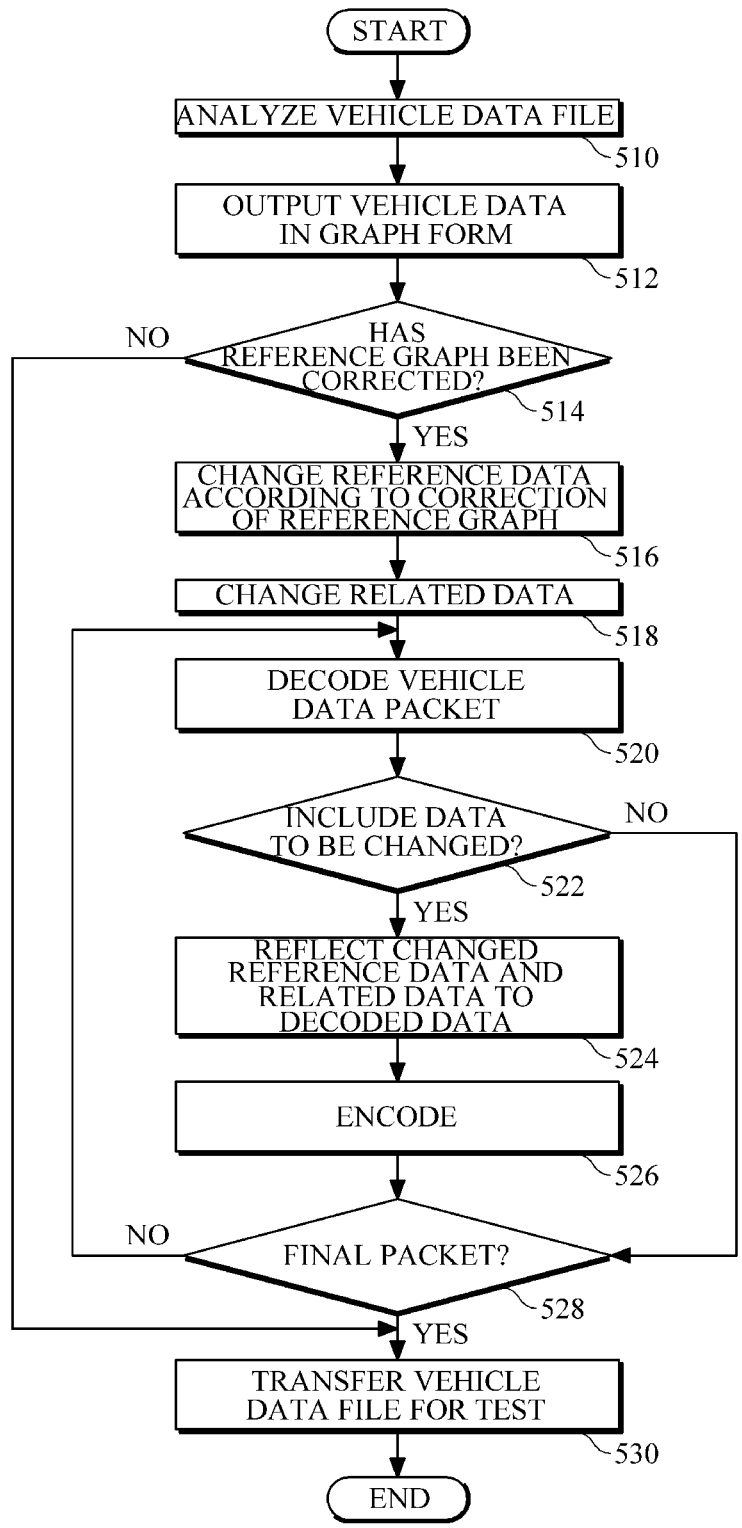
FIG. 5 is a flowchart detailedly illustrating the vehicle data providing method illustrated in FIG. 4.

FIG. 5 is a flowchart detailedly illustrating the vehicle data providing method illustrated in FIG. 4.

The vehicle data providing apparatus analyzes a vehicle data file that stores data that is used in a vehicle (510). A process of analyzing the vehicle data file may include operation of decoding each data packet included in the vehicle data file to check whether reference data or related data is included in the corresponding data packet. In order to check whether reference data or related data is included in the data packet, whether the corresponding data packet includes the ID of the reference data or the ID of the related data may be checked. The process of analyzing the vehicle data file may include operation of monitoring the changed amounts of reference data and the changed amounts of related data according to the changed amounts of the reference data to generate vehicle information database for the vehicle data file.

The vehicle data providing apparatus analyzes vehicle data included in the vehicle data file and outputs the result of the analysis as a graph (512). At this time, the vehicle data providing apparatus may output both a reference data graph and a related data graph about related data associated with the reference data. Also, the vehicle data providing apparatus may output, on a screen where the reference data graph is displayed, a guide message for setting a correction region to allow a user to correct a desired region of the reference data graph. If a correction region for the reference data has been set in advance, the vehicle data providing apparatus may visually show information about the correction region on the reference data graph. Also, the transverse axis of the reference data graph may represent time information of the vehicle data file.

If a user inputs a signal for changing the reference data through a user input device (514), the vehicle data providing apparatus changes the reference data graph in response to the signal to change the reference data (516), and then changes related data associated with the reference data according to the change of the reference data (518).

A vehicle data file for test has to maintain the format and content of a vehicle data file received from a vehicle, except for the changed values of reference data and related data. For this, in order to generate a vehicle data file for test, the vehicle data providing apparatus decodes packets included in the vehicle data file (520).

The vehicle data providing apparatus extracts a data ID from each vehicle data packet to determine whether the vehicle data packet includes data to be changed (522). That is, the vehicle data providing apparatus may determine whether the vehicle data packet includes reference data to be changed or related data to be changed.

If the corresponding data packet includes an ID of the reference data to be changed (522), the vehicle data providing apparatus reflects the changed reference data to the decoded data packet (524), and if the corresponding data packet includes an ID of changed related data (522), the vehicle data providing apparatus reflects the changed related data to the decoded data packet (524).

Then, the vehicle data providing apparatus encodes the decoded data packet to which the changed reference data or the changed related data has been reflected to the format of the data packet before decoding, and generates a new data packet to which the changed reference data or the changed related data has been reflected (526).

Thereafter, the vehicle data providing apparatus determines whether the processed data packet is a final packet (528). If the processed data packet is not a final packet, the process proceeds to operation 520 of decoding a next data packet. If the processed data packet is a final packet (528), the processed data packets are collected to generate a vehicle data file for test, and the vehicle data file for test is transferred to a test apparatus (530).

Figure 6:
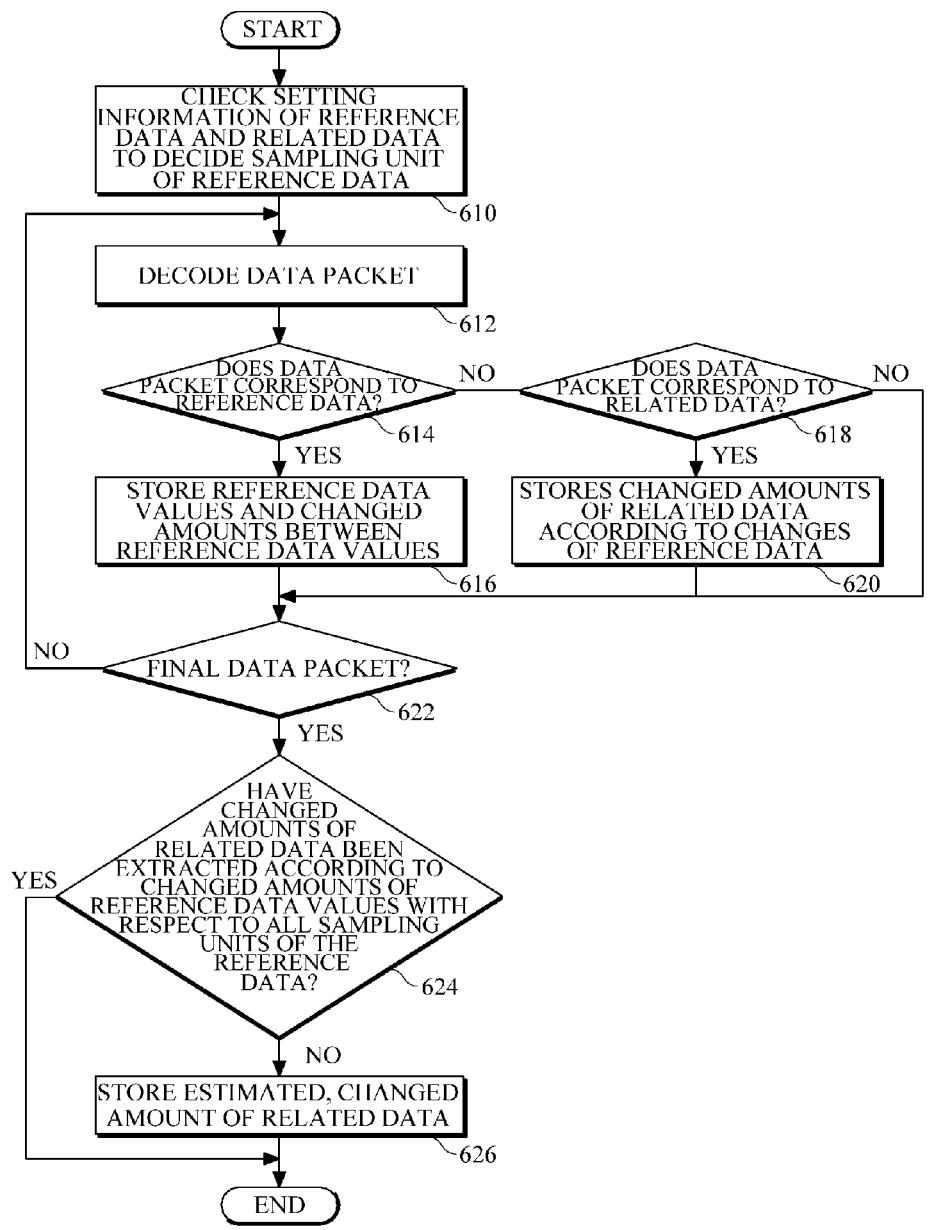
FIG. 6 is a flowchart illustrating a process of configuring an example of vehicle information database.

FIG. 6 is a flowchart illustrating a process of configuring an example of vehicle information database.

First, the vehicle data providing apparatus checks setting information of reference data and related data to decide a sampling unit of the reference data based on the setting information of the reference data and related data (610). The sampling unit of the reference data is unit information for expressing a changed amount of reference data and may be decided based on an allowable change range between the maximum and minimum values of the reference data. Alternatively, the sampling unit of the reference data may be set according to a user input signal. For example, if the reference data is speed information of a vehicle, a sample range may be from 0 to 255 and the sampling unit may be decided to 1.

Thereafter, the vehicle data providing apparatus decodes each data packet included in a received vehicle data file (612) to determine whether the data packet corresponds to (or contains) reference data or related data (614).

If the data packet corresponds to reference data (614), the vehicle data providing apparatus extracts reference data values and the changed amounts between the reference data values from the data packet, and stores the reference data values and the changed amounts between the reference data values (616). The changed amount between the reference data values may be a difference between a currently decided reference data value and the previously decided reference data value.

Meanwhile, if the data packet corresponds to related data (618), the vehicle data providing apparatus extracts related data values from the data packet and calculates the changed amounts of the related data values according to the changed amounts of the reference data values, and stores the related data values and the changed amounts of the related data (620). The changed amount of the related data may be a difference between the related data values according to a change between the corresponding reference data values.

For example, if the sample unit of vehicle speed (reference data) has been set to 1 and related data associated with the reference data has been set to RPM, the reference data and related data are processed as follows. If the vehicle speed is changed by 1 or more, the changed value of the RPM is stored, and at this time, the changed amount of the RPM is also stored. However, if the vehicle speed is not changed or is changed by 1 or less, the corresponding RPM is ignored.

If the currently processed data packet is not a final data packet of the vehicle data file, the process proceeds to operation 612 of decoding a next data packet.

If the currently processed data is a final data packet of the vehicle data file, that is, if the vehicle data file is completely analyzed (622), the vehicle data providing apparatus determines whether the changed amounts of the related data have been decided or extracted according to the changed amounts of the reference data values with respect to all sampling units of the reference data (624). As the result of analysis on the vehicle data file, no changed amount of the related data may be decided with respect to a specific sampling region of the reference data. In this case, the vehicle data providing apparatus may use information about the previously decided, changed amount of the related data to estimate a changed amount of the related data with respect to the specific sampling region (that is, an unmeasured region) of the reference data, and store the estimated, changed amount of the related data (626).

For example, the vehicle data providing apparatus may decide a total changed amount of the related data, corresponding to the unmeasured region of the reference data, and then deciding a changed amount of the related data for each sampling unit of the unmeasured region of the reference data, in consideration of a relationship between the changed amounts of the reference data and related data, simply under an assumption that the changed amount of the reference data is proportional/inverse-proportional to the changed amount of the related data. Alternatively, a changed amount of the related data, corresponding to the unmeasured region of the reference data may be set to an appreciate value by a user.

Figure 7:
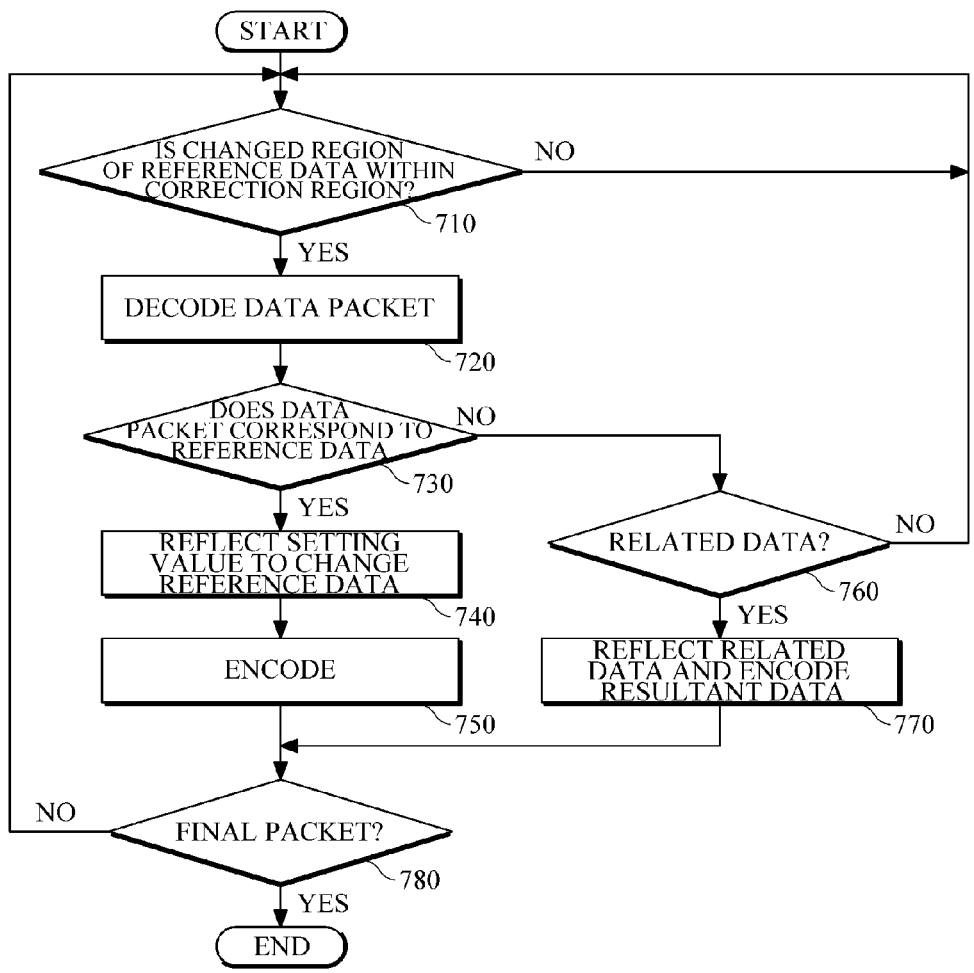
FIG. 7 is a flowchart illustrating a process of correcting vehicle data according to a change of reference data by a user.

FIG. 7 is a flowchart illustrating a process of correcting vehicle data according to a change of reference data by a user.

The vehicle data providing apparatus determines whether a region of reference data changed by a user is within a correction region on a reference data graph (710).

Then, if the changed region of the reference data is within the correction region, the vehicle data providing apparatus decodes the data packets of the reference data (720). Then, the vehicle data providing apparatus checks data IDs from the decoded data packets to determine whether each data packet corresponds to reference data or related data (730, 740).

If the data packet corresponds to reference data (730), the vehicle data providing apparatus reflects the changed value of the reference data to change the corresponding reference data value included in the data packet (740). The decoded data packet to which the changed reference data value has been reflected is encoded and then generated as a data packet for a vehicle data file for test (750).

Meanwhile, if the decoded data packet corresponds to related data (760), the vehicle data providing apparatus fetches related data corresponding to the reference data value from vehicle information database, reflects the related data value to the decoded data packet, and encodes the resultant data packet (770).

If the processed packet is a final packet of the changed region, the process is terminated, and data packets to which the changed reference data and related data have been reflected to the changed region are generated. Data packets not belonging to the changed region and data packets belonging to the changed region may be restored in the format of the original vehicle file and then transmitted to a test apparatus. As such, since when a user changes reference data values in a correction region, related data values associated with the reference data values are automatically changed, it is unnecessary to decode and encode an entire received vehicle data file, and accordingly, a time and a data processing amount required for generating a vehicle data file for test may be reduced.

Therefore, according to the examples as described above, a user can generate vehicle data for test, which can be used at the development stage of a product, based on existing vehicle internal data, without having to utilize high cost hardware equipment or a software simulator. Furthermore, internal data extracted from a vehicle is represented in a graph form that can be easily recognized by a user, the internal data values can be changed by correcting the graph, and new data that can be directly used for a test can be generated based on the corrected graph.

At this time, the user can change the data values by moving only the location of the graph at a desired time, without considering a data format of the internal data and a method of generating data values. Also, since the changed amounts of main vehicle internal data are automatically calculated and reflected using previously collected vehicle internal data, correction of the vehicle internal data is automatically reflected to correction of other main data associated with the vehicle internal data so that conditions similar to actual driving conditions can be easily reconfigured and the test can be performed in the conditions.

The present invention can be implemented as computer readable codes in a computer readable record medium. The computer readable record medium includes all types of record media in which computer readable data are stored. Examples of the computer readable record medium include a ROM, a RAM, a CD-ROM, a magnetic tape, a floppy disk, and an optical data storage. Further, the record medium may be implemented in the form of a carrier wave such as Internet transmission. In addition, the computer readable record medium may be distributed to computer systems over a network, in which computer readable codes may be stored and executed in a distributed manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A vehicle data providing apparatus comprising:
   a vehicle data analyzer configured to analyze a vehicle data file that is used in a vehicle, and to provide a reference data graph, in graph form using a screen, about reference data included in the vehicle data file;
   a vehicle data changing unit configured to receive a user input signal for changing the reference data, and to change related data associated with the reference data based on the reference data graph; and
   a test data file generator configured to generate a vehicle data file for test, including the changed reference data and the changed related data.

2. The vehicle data providing apparatus of claim 1, further comprising a display configured to display the reference data graph provided by the vehicle data analyzer,
   wherein the vehicle data analyzer configures the screen showing the changed reference data and the changed related data in a graph form and displays the screen through the display.

3. The vehicle data providing apparatus of claim 1, wherein the vehicle data changing unit receives a user input signal for setting a correction region on the reference data graph, and changes the related data based on a changed amount of the reference data included in the correction region.

4. The vehicle data providing apparatus of claim 3, wherein the user input signal for changing the reference data is a signal for moving a graph line included in the correction region on the reference data graph in a specific direction.

5. The vehicle data providing apparatus of claim 1, further comprising:
   a vehicle communication unit configured to receive the vehicle data file by communicating with the vehicle; and
   a data storage configured to store data,
   wherein the vehicle data analyzer collects the vehicle data file, generates vehicle information database using the collected vehicle data file, and stores the vehicle information database in the data storage.

6. The vehicle data providing apparatus of claim 5, wherein the vehicle data analyzer monitors a changed amount of the reference data from the collected vehicle data file, monitors a changed amount of the related data according to the changed amount of the reference data, and stores the changed amount of the reference data and the changed amount of the related data according to the changed amount of the reference data to thereby generate the vehicle information database.

7. The vehicle data providing apparatus of claim 1, wherein the vehicle data analyzer predicts a changed amount of the related data corresponding to the changed amount of the reference data, and store the predicted, changed amount of the related data to thereby reflect the predicted, changed amount of the related data to vehicle information database.

8. The vehicle data providing apparatus of claim 1, further comprising a user input unit configured to receive a user input signal for setting reference data and related data associated with the reference data with respect to vehicle data included in the vehicle data file.

9. The vehicle data providing apparatus of claim 1, wherein if the user input signal indicates to change reference data that is within a correction region, the vehicle data changing unit changes the reference data and the related data associated with the reference data in response to the user input signal, whereas if the user input signal indicates to change reference data that is not within the correction region, the vehicle data changing unit ignores the user input signal.

10. The vehicle data providing apparatus of claim 1, further comprising a file transfer unit configured to transfer a vehicle data file for test to a test apparatus that performs a test using the vehicle data file for test.

11. A vehicle data providing method comprising:
   analyzing a vehicle data file that is used in a vehicle, and providing a reference data graph, in graph form using a screen, about reference data among data included in the vehicle data file;
   receiving a user input signal for changing the reference data based on the reference data graph; and
   changing the reference data and related data associated with the reference data according to reception of the user input signal; and
   generating a data file for test, including the changed reference data and the changed related data.

12. The vehicle data providing method of claim 11, further comprising configuring the screen showing the changed reference data and the changed related data in a graph form and displaying the screen.

13. The vehicle data providing method of claim 11, further comprising receiving a user input signal for setting a correction region of the reference data graph,
   wherein the changing of the related data according to the reception of the user input signal comprises when the user input signal for setting the correction region of the reference data graph is received, changing the related data based on a changed amount of reference data included in the correction region.

14. The vehicle data providing method of claim 11, wherein the user input signal for changing the reference data is a signal for moving a graph line included in the correction region on the reference data graph in a specific direction.

15. The vehicle data providing method of claim 11, further comprising:
   collecting the vehicle data file; and
   analyzing a plurality of pieces of data packets included in the collected vehicle data file to generate vehicle information database.

16. The vehicle data providing method of claim 15, wherein the generating of the vehicle information database comprises:
   monitoring a changed amount of the reference data from the collected vehicle data file;
   monitoring a changed amount of the related data according to the changed amount of the reference data; and
   storing the changed amount of the reference data and the changed amount of the related data according to the changed amount of the reference data.

17. The vehicle data providing method of claim 15, wherein the generating of the vehicle information database further comprises predicting a changed amount of the related data corresponding to the changed amount of the reference data, and storing the predicted, changed amount of the related data.

18. The vehicle data providing method of claim 11, further comprising receiving a user input signal for setting reference data and related data associated with the reference data with respect to vehicle data included in the vehicle data file.

19. The vehicle data providing method of claim 11, further comprising transmitting the data file for test to a test apparatus.

20. The vehicle data providing method of claim 11, wherein the generating of the data file for test comprises:
   decoding a data packet included in the vehicle data file;
   reflecting, if the data packet includes at least one of the changed reference data and the changed related data, a value of the at least one of the changed reference data and the changed related data to the decoded data packet; and
   encoding the resultant data packet to which the value of the at least one of the changed referenced data and the changed related data has been reflected.

* * * * *